United States Patent
Questa

(10) Patent No.: US 11,073,613 B2
(45) Date of Patent: Jul. 27, 2021

(54) METHOD FOR THE OPTIMIZATION OF THE PROCESS DECODING CODED ULTRASOUND SIGNALS AND ULTRASOUND SYSTEM OBTAINED BY SAID METHOD

(71) Applicant: ESAOTE SpA, Genoa (IT)

(72) Inventor: Antonio Questa, Novi Ligure (IT)

(73) Assignee: Esaote S.p.A., Genoa (IT)

( * ) Notice: Subject to any disclaimer, the term of this patent is extended or adjusted under 35 U.S.C. 154(b) by 488 days.

(21) Appl. No.: 15/761,551

(22) PCT Filed: Sep. 23, 2016

(86) PCT No.: PCT/IB2016/055686
§ 371 (c)(1),
(2) Date: Mar. 20, 2018

(87) PCT Pub. No.: WO2017/051359
PCT Pub. Date: Mar. 30, 2017

(65) Prior Publication Data
US 2018/0275272 A1    Sep. 27, 2018

(30) Foreign Application Priority Data

Sep. 24, 2015  (IT) .......................... UB2015A003856

(51) Int. Cl.
*G01S 15/89* (2006.01)
*G01S 7/52* (2006.01)

(52) U.S. Cl.
CPC ...... *G01S 15/8961* (2013.01); *G01S 7/52047* (2013.01); *G01S 15/8959* (2013.01)

(58) Field of Classification Search
CPC ............. G01S 15/8961; G01S 15/8959; G01S 7/52047

(Continued)

(56) References Cited

U.S. PATENT DOCUMENTS

| 5,938,611 A | 8/1999 | Muzilla et al. |
| 2010/0099986 A1 | 4/2010 | Azuma et al. |

(Continued)

FOREIGN PATENT DOCUMENTS

| JP | 2005 221321 A | 8/2005 |
| WO | WO 01/73470 A1 | 10/2001 |

OTHER PUBLICATIONS

Hwang, Reliability Optimization by Generalized Lagrangian-Fuction and Reduced-Gradient Methods (Year: 1979).*

(Continued)

*Primary Examiner* — Michael P Nghiem
*Assistant Examiner* — Dacthang P Ngo
(74) *Attorney, Agent, or Firm* — Dickinson Wright PLLC

(57) ABSTRACT

A method is provided for the optimization of the process decoding coded ultrasound signals that comprises: defining/selecting a coding function for ultrasound pulses transmitted to a body under examination by means of a predetermined probe; defining the coefficients of a filter decoding the received signal depending on the selected coding function; using said filter coefficients as the setting of the decoding filter corresponding to said predetermined probe for all the ultrasound systems provided in combination with said probe; and wherein the coefficients of the decoding filters are determined by the minimization, by a heuristic iterative process, of the difference between the characteristics of a receive signal, obtained in a real transmit/receive sequence and filtered with a decoding filter, and the characteristics of an ideal receive signal, that is a nominal one, by using as the coefficients of the decoding filter those obtained in the last iterative step.

16 Claims, 8 Drawing Sheets

(58) Field of Classification Search
USPC .......................................................... 702/159
See application file for complete search history.

(56) References Cited

U.S. PATENT DOCUMENTS

2014/0121516 A1* 5/2014 Kim .................... G01S 15/8915
　　　　　　　　　　　　　　　　　　　　　600/437
2016/0262729 A1* 9/2016 Srinivasan ........... A61B 8/5269

OTHER PUBLICATIONS

Misaridis T. X. et al., "Potential of Coded Excitation in Medical Ultrasound Imaging", Ultrasonics, IPC Science and Technology Press Ltd., Guildford, GB, vol. 38, No. 1-8, Mar. 1, 2000, pp. 183-189, XP027331173.
Venkatraman S. et al, "Combining Pulse Compression and Adaptive Drive Signal Design to Inverse Filter the Transducer System Response and Improve Resolution in Medical Ultrasound", Medical and Biological Engineering and Computing, Springer, Heidelberg, DE, vol. 34, No. 4, Jul. 1, 1996, pp. 318-320, XP000595520, ISSN: 0140-0118, DOI: 10.1007/BF02511247.
Welch, Laurence R., B.S., M.S., Central Laboratory for Imaging Research University of Connecticut, Pulse Compression Ultrasound for Minimization of Transmitted Peak Power, pp. 88-91. IEEE 1994.
Takeuchi, Y., GE-Yokogawa Medical Systems, Ltd., Hino, Japan, "Coded Excitation for Harmonics Imaging," 1996 IEEE Ultrasonics Symposium, pp. 1433-1436.
PCT International Search Report and Written Opinion of the International Searching Authority, dated Dec. 22, 2016.
IT UB20153856 Priority Application Search Report dated Jun. 10, 2016.

\* cited by examiner

| Length | Codes | |
|---|---|---|
| 2 | +1 −1 | +1 +1 |
| 3 | +1 +1 −1 | |
| 4 | +1 +1 −1 +1 | +1 +1 +1 −1 |
| 5 | +1 +1 +1 −1 +1 | |
| 7 | +1 +1 +1 −1 −1 +1 −1 | |
| 11 | +1 +1 +1 −1 −1 −1 +1 −1 −1 +1 −1 | |
| 13 | +1 +1 +1 +1 +1 −1 −1 +1 +1 −1 +1 −1 +1 | |

$$F_{appr.Full} = \sum_{i=0}^{i=N} C_i \times \text{Kernel}(F_p)_{Fc}$$

Eq. 1

METHOD FOR THE OPTIMIZATION OF THE PROCESS DECODING CODED ULTRASOUND SIGNALS AND ULTRASOUND SYSTEM OBTAINED BY SAID METHOD

BACKGROUND

Field

The present invention relates to a method for the optimization of the process decoding coded ultrasound signals and to an ultrasound system obtained by said method.

Description of Related Art

Pulse compression and coded transmission techniques developed for radar applications aiming at considerably improving echo signal-to-noise ratio (eSNR) have found an application field also in diagnostic ultrasound imaging.

Ultrasound signal transmission is bound by requirements of the functional type and by regulations-related requirements:

functional requirements require the pulse length, from which the transmitted signal and therefore the axial resolution depend, to be short, such to achieve a short time response;

regulations-related requirements limit the characteristics of the acoustic emission, with a particular reference to the negative peak of the transmitted pulse, with the aim of controlling the bioeffects induced in the patient.

The fact of meeting said requirements results in a deeply limited transmission energy, with a consequent limit to the echo signal-to-noise ratio (eSNR).

The adoption of coding techniques known in radar applications allowed such limits to be overcome. The use of a suitably coded and broad band transmission signal allows the band of the transducer to be better illuminated, without violating acoustic emission limits. This leads to a clear improvement of the echo signal-to-noise ratio, due to an increased time-bandwidth product (TBP) and therefore to a greater penetration depth, without a considerable reduction in axial resolution, provided that a corresponding decoding filter is used.

From the document Matthew O'Donnell, Senior Member, IEEE, "Coded Excitation System for Improving the Penetration of Real-Time Phased-Array Imaging Systems" IEEE TRANSACTIONS ON ULTRASONICS, FERROELECTRICS, AND FREQUENCY CONTROL, VOL. 39, NO. 3, MAY 1992, different coding types are known which are used in the industry. Among these types firstly the "chirp" type coding (linear FM), Barker Codes and Golay codes (performed in PSK) have to be mentioned.

The decoding filter actually is an autocorrelation filter, that is a device that operates in a nominal manner the signal convolution with its time-reversed copy, aiming at obtaining a narrow pulse (one/two cycles) centered on the burst.

Together with the characteristics of the transmission coding, the definition of this filter is the main operating problem arising when applying the theoretical assumptions on a physical ultrasound system.

Two families of the decoding filters are known in the prior art:

Filters called as "matched" filters that have the drawback of having time sidelobes typically unacceptable for an ultrasound image, moreover characterized by the signal logarithmic compression.

By way of example and such as shown in the graph in FIG. 1, the document B. Haider, P. A. Lewin, and K. E. Thomenius, "Pulse elongation and deconvolution filtering for medical ultrasonic imaging", in Proc. IEEE Ultrason. Symp., 1995, pp. 1303-1308 shows the effects of a Barker coding from which the decoded signal has time sidelobes at about −22 dB under the peak, where it would be necessary to guarantee a minimum of −45 dB.

An example of the Baker type coding is described in the document T. Misaridis and J. A. Jensen, "An effective coded excitation scheme based on a predistorted FM signal and an optimized digital filter", in Proc. IEEE Ultrason. Symp., 1999, pp. 1589-1593.

Therefore optimum solutions are different from canonical solutions and involve a series of compromises between the gain that can be obtained on the response peak and the contents of time spurious lobes.

In prior art alternative solutions are known based on the so called "mismatched" filters that are long or longer by a 2-3 factor than the transmitted signal such as for example described in the document U.S. Pat. No. 5,938,611 and shown in FIG. 2.

In particular the document U.S. Pat. No. 5,938,611 describes a color flow imaging method using the coded transmission technique. Pulses are coded on transmit and compressed on receive. The compression on receive occurs by filters of the matched or mismatched type. A coding sequence such as the Barker sequence is modulated on a transmission burst. On receive the signals are coded by a FIR filter. The coefficients suitable for the filter are determined on the basis of the coding sequence, the demodulation frequency and the downsampling values used on receive. Mainly these are theoretic values or setting values of the system that allow the ideal filter for the coding provided on transmit to be determined in advance.

Besides the merely technical, scientific and functional aspect, the setting of the coefficients of the filters for obtaining the ideal decoding filter is a critical operation, since it is performed once at factory setting level. Currently, in particular, the coefficients of the filter are determined for a specific probe only once, in laboratory and on a test ultrasound system operating on specific test targets such as phantoms or the like (for example objects with a minimum thickness, comparable as much as possible with an infinitesimal body, such to distinguish the response related to the transmitted signal and the influence of the characteristics of the target). Coefficients determined in this manner are stored and used for setting the decoding filter on all the systems in combination with the specific ultrasound probe. Such process for determining only once the filter coefficients, is performed for each type of probe provided for the ultrasound system. Therefore each probe, for which the use of the coding technology is provided, is associated to its specific set of coefficients for determining the decoding filter.

The calculation of the filters (coefficients) has to be performed for each probe and for each apparatus. Therefore since it is an intrinsically complicated operation, the activity is very burdensome on the whole.

SUMMARY

A first aspect of the present invention therefore is to provide a method for the synthesis/definition of the optimal filter associated with a specific coding such to optimize said process decoding coded ultrasound signals.

A further aspect is to provide a method for the synthesis/definition of the optimal filter associated with a specific coding under given parameters, such as the characteristics of the ultrasound machine/probe system and the dispersive attenuation of the medium. This latter can lead to define several sets of coefficients depending on the depth and characteristics of the medium.

The invention achieves the above aims by a method for the optimization of the process decoding coded ultrasound signals, which method provides the following steps:

defining/selecting a coding function for ultrasound pulses transmitted to a body under examination by means of a predetermined probe;

defining the coefficients of a filter decoding the received signal depending on the selected coding function;

using said filter coefficients as the setting of the decoding filter corresponding to said predetermined probe for all the ultrasound systems provided in combination with said probe;

and wherein the coefficients of the decoding filters are determined by the minimization, by a heuristic iterative process, of the difference between the characteristics of a receive signal, obtained in a real transmit/receive sequence and the characteristics of an ideal receive signal, that is a nominal one, by using as the coefficients of the decoding filter those obtained in the last iterative step.

Particularly there is provided a step defining the filter coefficients comprising the following steps:

a) defining or selecting the ideal, that is nominal, characteristics of the signal obtained by decoding the received echo signal, that is a reference nominal template or pattern (model) of the decoded signals;

b) executing a sequence for the transmission of ultrasound signals coded according to the selected coding function and in a test environment where there are provided predetermined reflectors with a predetermined space distribution in said test target environment, for the reception of echo signals due to the reflection of said transmission coded pulses by said reflectors and for decoding the received echo signals, which decoding is carried out according to an initial selection of the coefficients of the decoding filter;

c) using the receive signals, decoded for determining the differences between the characteristics of said signals received and decoded at the previous step and the characteristics of the ideal, that is nominal, decoded receive signal, that is the reference nominal template or pattern of the decoded signal;

d) calculating by an heuristic optimization algorithm new coefficients of the decoding filter that minimize the difference between the characteristics of said received and decoded signals and those of the nominal decoded receive signal, that is of the reference nominal template or pattern of the decoded signal;

e) repeating steps c) and d) till reaching values below a maximum limit threshold for said differences between the signals received and decoded at the previous step and the nominal decoded receive signal, that is the reference nominal template or pattern of the decoded signal and/or till reaching a maximum number of iterations;

using the coefficients of the decoding filter obtained by the last performed iteration as the coefficients of the decoding filters to be employed on ultrasound systems in combination with the predetermined type of probe.

Criteria defined by the pattern or model of the ideal or nominal receive signal can be about at least one or more of the following parameters: signal-to-noise ratio, intensity of sidelobes or time spurious lobes, the intensity of the response peak.

According to a further characteristic the intensity of the secondary lobes or time spurious lobes is calculated as the mean of the values of said lobes.

From the above it is clear that principle of the present optimization process can be adapted to different applications in the ultrasound field. In this case, that is in the case of using a coding of the Baker type, the optimization of the coefficients of the correlation filter is used to obtain the compression of the received signal in connection with a coded transmission with a length of N pulses (or cycles).

It is possible to use different heuristic algorithms for calculating the coefficients of the decoding filter among the currently known ones.

Example of currently existing heuristic algorithms for example are evolutionary algorithms, such as for example genetic algorithms, algorithms called as simulated annealing, those called as Ant colony Optimization (ACO), algorithms called as differential evolution (DE), those called as harmony search (HS), artificial bee colony (ABC) Cuckoo search algorithm (CS).

A particular family of optimization algorithms are the so called Non Linear Programming solver. Among these algorithms the optimization algorithms called as Generalized Reduced Gradient (GRG) and Sequential Quadratic Programming (SQP) optimization algorithms are for example known. However the above mentioned algorithms have not be intended as a limitation, but only as an example since the general optimization problem is a problem analysed and present in almost all the technical fields and new variants or new algorithms are constantly being developed that can find an application in the method of the present invention.

With reference to the above, it is clear that the method of the present invention is not limited to the determination of the optimal or ideal filter only by calculating the coefficients of the decoding filters on the basis of theoretical data or setting data of the system, but it operates on a real receive signal generated by a transmission signal emitted in a testing target and which receive signal has been actually received by a probe and therefore subjected to decoding process.

Since it is possible to accurately define the characteristics of the transmission signal, both ideal or nominal ones or anyway the characteristics desired for the receive signal, it is also possible to define a theoretical or ideal reference template or pattern of the decoded receive signal. The present invention therefore provides to use a matching within a given margin of error between the characteristics of said template or pattern and the characteristics of the receive signal obtained by means of a specific selection of the coefficients of the decoding filter.

The choice of operating on a real signal and not only on the basis of theoretical calculations allows also to consider systematic effects introduced by the ultrasound system in combination with the probe and by operating units composing the system, therefore improving the result of the process decoding and extracting the receive signal.

In one embodiment the real start data, that is the receive signal caused by the coded transmission signal are obtained by measurements by hydrophone.

Such real data consider not only the coding applied to the transmission signal, but also the band of the probe, the signal attenuation, the focusing used on the probe and therefore the coefficients of the decoding filter obtained by the present invention go beyond the decoding based on coefficients of the filter calculated only on the basis of theoretical characteristics of the modulating signal, that is the coding applied on transmit.

The method according to the present invention allows coefficients of the decoding filter to be determined optimized for the frequency bands corresponding to a harmonic frequency of the fundamental frequency, thus allowing the application of the signal coding technology to be extended also to harmonic imaging.

The invention relates also to a combination composed of an ultrasound system comprising:

means generating signals exciting an ultrasound probe for emitting a sequence of coded pulses;

a transmitting probe of a predetermined type and having specific characteristics and to which said excitation signals are fed for generating and emitting ultrasound pulses coded according to a predetermined coding function;

a target test environment having a predetermined space distribution of at least two reflectors and wherein said transmission coded pulses of the probe are transmitted;

a hydrophone receiving said reflection signals generated by the transmission pulses emitted in the target test environment;

means for storing the receive signals produced by the hydrophone;

a comparison and calculation unit that determines a set of coefficients for a filter decoding the coded signals by comparing the characteristics of the receive signals measured by the hydrophone with a template or pattern, that is with the characteristics of a reference ideal/nominal stored signal, which coefficients are determined as a result of the minimization of the difference between the characteristics of the received measurement signal and of the reference receive signal;

means storing said coefficients in the form of a data file setting the ultrasound systems that use a probe of the type used as the transmission probe.

Said storage means can be composed of portable digital reading/writing media, also of the rewritable type.

Particularly the invention provides a portable storage unit of the rewritable type or not on which the coefficients setting the decoding filter by a predetermined function coding the transmission signal for a predetermined type of probe are stored.

Still according to one embodiment, the file containing the coefficients of the decoding filters for a predetermined type of probe are implemented in the form of a device driver installable on demand by the user or self-installable upon the connection of the corresponding type of probe to the ultrasound system.

Finally the invention relates to an ultrasound system for carrying out imaging by coded transmission pulses that provides at least one demodulator of the receive signal which demodulator is in the form of a decoding filter and whose coefficients are loadable or loaded from a configuration/setting file generated by the method according to the present invention described above and possibly in the form of configuration or driver files of the probe of the self-installing type or installable by a command.

Further characteristics of the invention are the subject matter of the independent claims.

BRIEF DESCRIPTION OF THE DRAWINGS

These and other characteristics and advantages of the present invention will be more clear from the following description of some embodiments shown in the annexed drawings wherein.

DETAILED DESCRIPTION OF ILLUSTRATIVE EMBODIMENTS

As regards terms used in the technical field of the invention the process demodulating the receive signal is defined also as decoding process. Such operation is performed by a deconvolution of the received signal that can be carried out by using a deconvolution or decoding filter, such as for example a filter of the FIR type, whose coefficients are mainly defined by the function inverse to the coding function.

It has to be noted that deconvolution or deconvolutor term is assimilable to convolutor or convolution term since the two operations are substantially equal since they are used one with a function and the other one with the corresponding inverse function.

Although the principle according to the present invention is applied to any type of sequence or of function coding the transmission pulses, the described example uses only the coding by Barker sequences. However the invention has not to be considered as being limited to such example, since for the person skilled in the art it is clear how to modify the general described steps to adapt them to other types of coding.

In the described example, the so called Barker sequences are used for the bi-phase modulation of ultrasound transmission pulses, according to the technology called as Bi-phase Pulse-shift-keying.

Barker codes are known and their characteristics are described in details in the documents already mentioned above, as well as the manners for extracting information about reflectors in the body under examination from the received reflection signals. Anyway for completeness purposes and for easiness in reading the present description the characteristics of coding and decoding by Barker codes are briefly summarized below.

An ultrasound system, in its traditional operation, transmits a pulse with a limited duration (TX phase) and it receives (RX phase) the response from the transducer. Such response, related to the characteristics of the medium it passes through, allows an image to be constructed that contains data useful for the interpretation of diseases.

In the case of an ultrasound system using a coded waveform it is possible to assume that the transmitted pulse and the received signal are inputs of a correlator that outputs the received and decoded signal.

In Barker coding a sequence (called as Baker sequence) is used that is a sequence of +1 and −1 with a finite length N where autocorrelation function is:

$$R_c(k) = \sum_{j=1}^{N-1-|k|} C_j C_{j+|k|}$$

Figure 1:
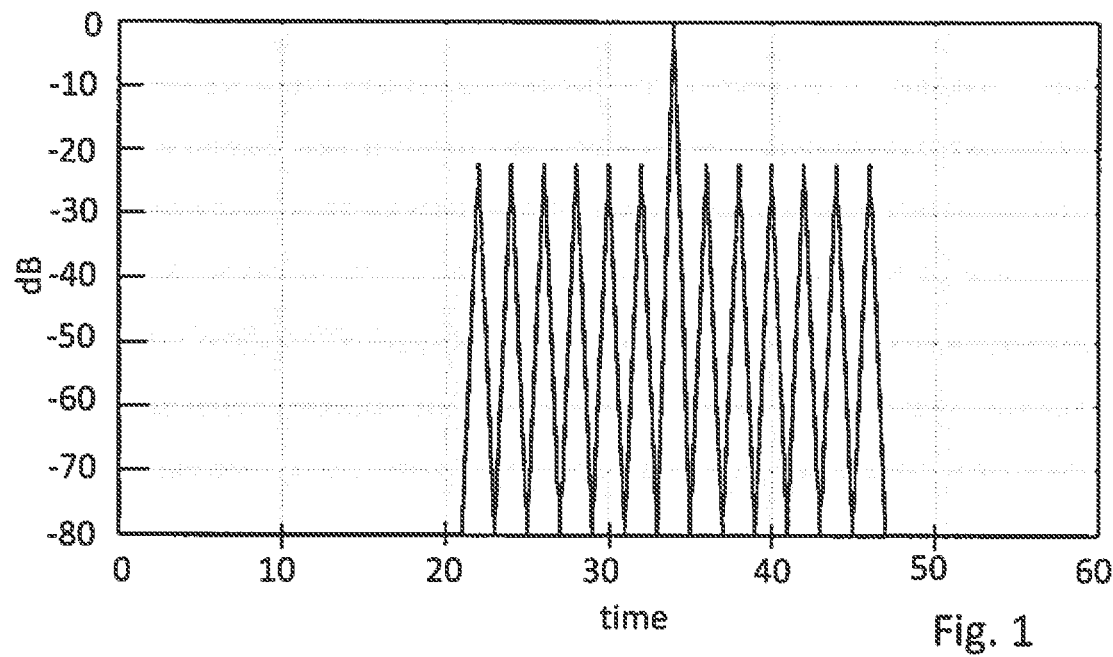
FIG. 1 is the pattern of the receive signal obtained by a transmission of coded pulses by a decoding with a filter of the "matched" type.
Figure 2:
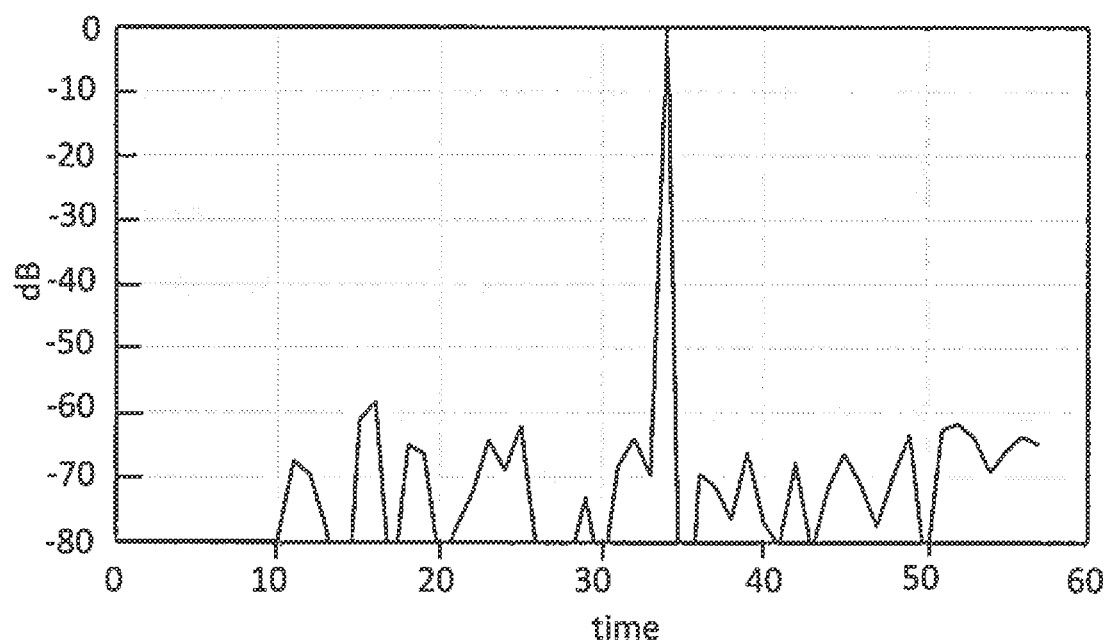
FIG. 2 is the pattern of a receive signal obtained by a transmission of coded pulses by a decoding with a filter of the "mismatched" type.
Figures 3, 4:
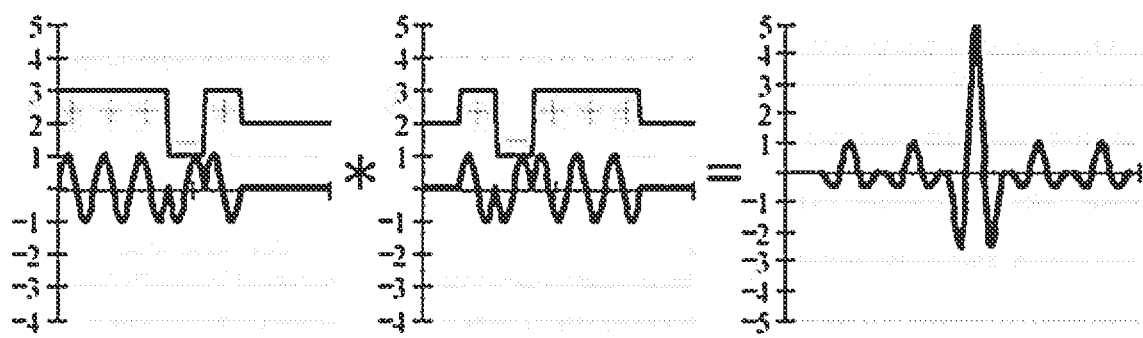
FIG. 3 is a table with the different known Baker sequences.
FIG. 4 is a schematic and simplified example of the principle of the coded transmission by a coding sequence called as Barker sequence.

For $|k|<N$, is zero elsewhere
and wherein $C_j$ is the coding sequence having length j and $C_{j+|k|}$ the one having length j+|k|, while Rc(k) is the autocorrelation function and N is a natural number. Baker sequences are known only for some values of N as shown in the table of FIG. 3.

The main characteristic of this family of codes is the possibility of easily obtaining the resulting function with a decorrelation or deconvolution operation.

Therefore in order to extract information from receive signals, the coded transmission sequence requires for the receive signals a deconvolution filter having a length at least equal to the transmission.

For example in the case of autocorrelation (matched filter) for a typical transmission with carrier at 3.5 MHz of the Barker 13 (13 pulses) type the length of the transmission is about 4 usec and the level of the secondary space lobes, compression residue, is Att=20*log(1/13)=−22.7 dB. This is an unacceptable value for an ultrasound image requiring an attenuation of space secondary lobes higher than 55-60 dB.

If the deconvolution filter is of the mismatched type and of a more complex type higher attenuations are achieved. Particularly the longer the sequence is the higher the suppression of side lobes is.

Acceptable values of the attenuation are achieved with lengths at least of 2-3 times the length of the transmitted signal. This, compared with the sampling frequency, typically at least 50 MHz and for a coded transmission signal of 4 usec, means length of the filter expressed in a number of samples of 600 values.

The above rises an important problem is performing the optimization process on a very high number of variables (samples).

Performances of the method, therefore have a critical condition in defining filtering parameters for performing the deconvolution operation and this is due to both their number and to the calculation of the coefficients themselves (reliability of the convergence of the optimization process).

In order to reduce the computational burden of the optimization process and to facilitate the convergence of the approximating function it is possible to think of performing a decimation of the data with a decimation factor D and consequently a reduction of the number of variables, that is coefficients, to be optimized up to 1-2 for each transmission cycle (carrier frequency). It has to be noted that the decimation is related to only the definition of the coefficients to be used in the approximation calculation and as such, it has not to meet the constraints set by the Nyquist criterion for the sampling. The best approximating function will depend on the number (number of samples/D) and on the position of the points used in the description of the signal (start point of the samples). The number of samples, related to D, can change till finding the optimal value, and the start position of the decimated points can be changed to obtain the best approximating function.

The deconvolution filter will be given by the samples ($C_N$) at the sampling frequency $F_c$, of the sinusoidal kernel sequence at the carrier frequency $F_p$ and with amplitude equal to the coefficients generated by the optimization process as defined in equation 1 below:

$$F_{appr.Full} = \Sigma_{i=0}^{i=N} C_i \times \text{Kernel}(F_p)_{Fc}$$

Wherein Ci are the samples and Fp is the carrier frequency and Fc is the sampling frequency.

Figure 7:
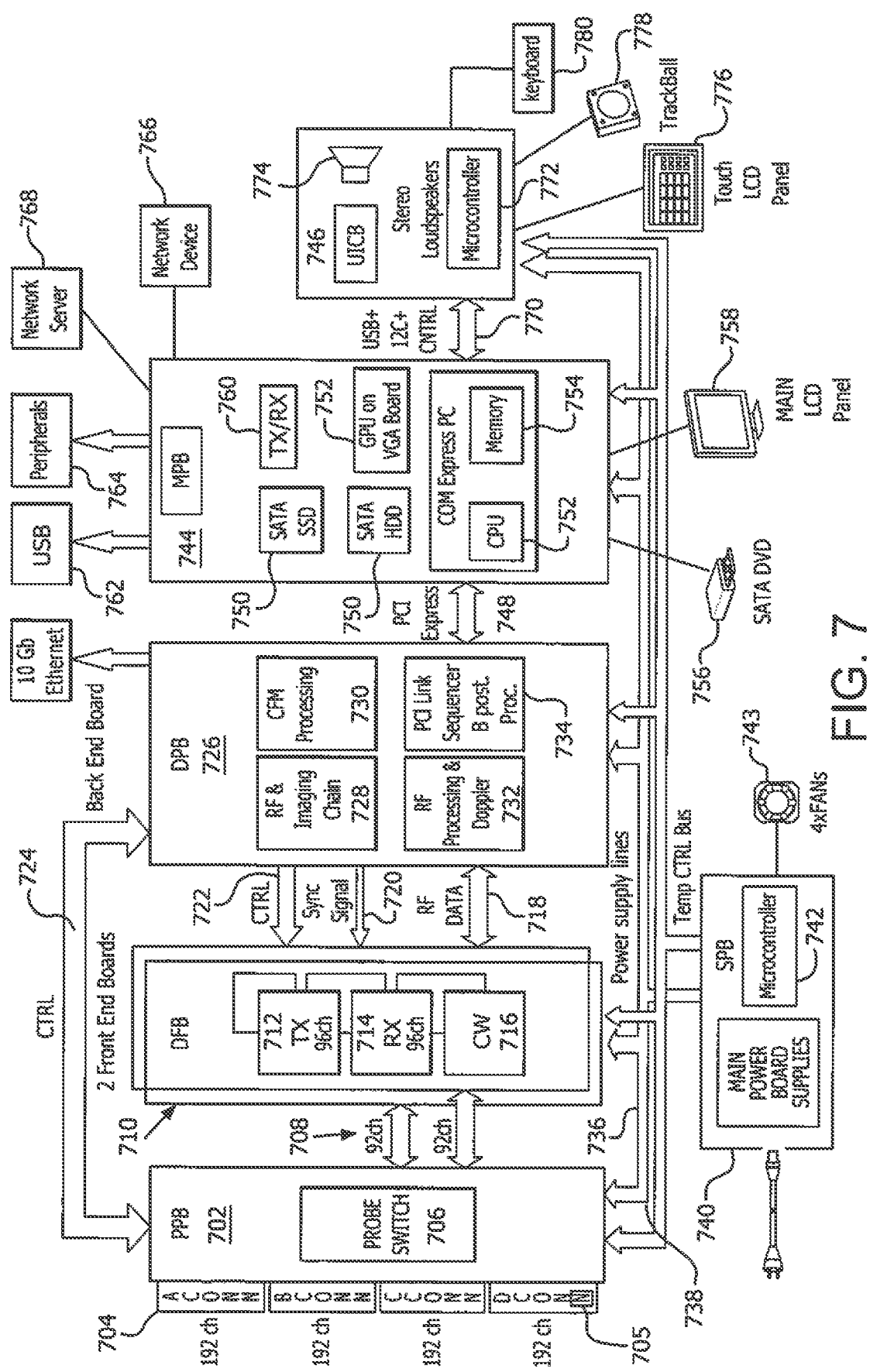
FIG. 7 illustrates a block diagram of an ultrasound system formed in accordance with an alternative embodiment.

FIG. 7 is an example with 1 coefficient per transmission cycle.

Finally if the sampling frequency Fc is such to oversample the receive signals with respect to their loading band, it is possible to provide to simplify the filter by introducing a decimation both of the filter coefficients and of the receive signals to be compressed. The decimation has to be carried out observing the constraints of the Nyquist sampling theorem.

FIG. 4 schematically and by the help of the graphs shows the decorrelation or deconvolution principle used for decoding the receive signal generated by coded transmission pulses.

The square wave shows the modulation and demodulation function respectively, that is the function coding the carrier of the transmission signal and the decoding function, while the graph with a more wave-like path shows the effect of modulation on the carrier. The convolution action is defined by the sign * and the output decoded signal is shown on the right of the sign =. It has to be noted how the intensity of the secondary lobes over time is very low than peak intensity.

From what results from the description of prior art documents mentioned above, the parameters of the correlation filters between coded transmitted pulses and received pulses namely deconvolution filters, the currently known techniques provide to estimate in a theoretical manner or on the basis of mathematical simulations the parameters of the filters in order to obtain signal-to-noise ratio characteristics, penetration depth, resolution, suppression of satisfactory sidelobes.

It has to be noted that the definition of such parameters of the correlation filters, that is deconvolution filters, generally is carried out at the manufacturer, only once for all the machines and for each one of the probes of a specific type and even of a specific manufacturing lot to which the coefficients specific for each probe type and/or lot are then associated.

The values setting the parameters of the decoding or deconvolution filters as a function of a specific type of probe therefore are stored in the software of ultrasound apparatuses to be retrieved when said specific probe is connected to the ultrasound apparatus.

The precision and accuracy of such parameters therefore is a critical aspect for the quality of information and therefore of the image obtained by the receive signals.

The determination simulated on a mathematical theoretical basis is surely able to approach reality to a great extent but considering systematic and asystematic aberrations of a complicated device as a ultrasound machine, surely many of these aberrations or deviations from the ideal theoretical case cannot be considered and often are not known from a quantitative perspective.

Figure 5A:
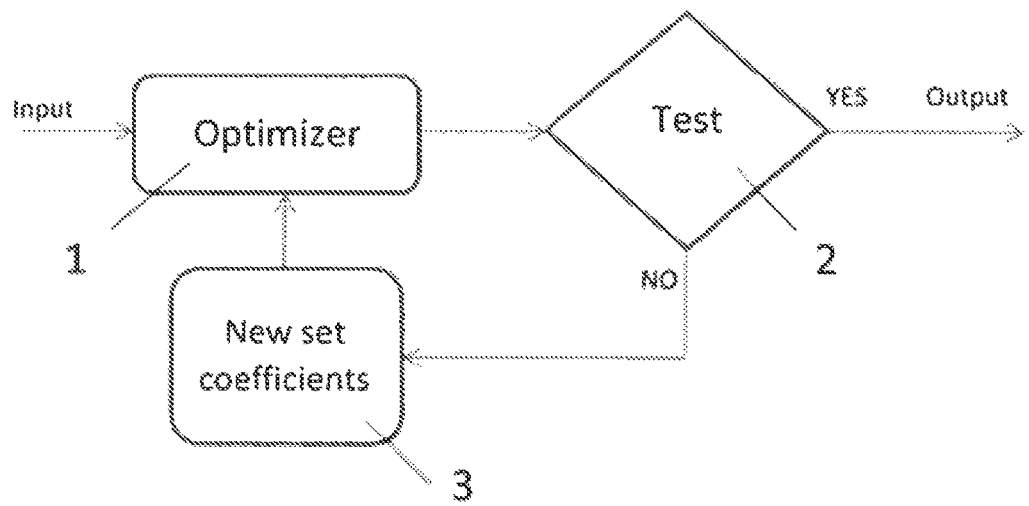
FIG. 5a is a block diagram of the method according to the present invention.

FIG. 5 shows a block diagram of the process according to the present invention.

The process provides a step generating the sequence of coded transmission pulses and the transmission of such pulses in a test target.

The transmitted signals are measured by hydrophone after having been transmitted in the target environment and reflected by reflectors present in said target environment. The characteristics of the receive signals acquired by the hydrophone are therefore detected and stored.

The receive signals measured in this manner are subjected to an optimization process providing the following steps:

determining nominal or ideal values for example by means of theoretical calculations of the desired characteristics of the receive signals after the decoding or deconvolution step by the filters which nominal values compose or are summarized in a template or pattern of a reference decoded receive signal;

determining the differences among the characteristics of the signal received and decoded on the basis of a first setting of the coefficients of decoding filters and the characteristics of the template or pattern of the reference signal;

calculating by means of iterative optimization steps the coefficients of the decoding filters that minimize within predetermined margins of error the differences among the characteristics of the received and coded signal and the characteristics of the template or pattern of the reference signal;

storing such coefficients for being used as values for setting/configuring the filters of ultrasound systems for a type of probe or for a group of probes belonging to a specific lot of a type and that have been used for transmitting sequences of coded transmission pulses.

In FIG. 5 the input signal composed of the receive signal of the hydrophone is supplied to the optimizer 1. It carries out the decoding by using the coefficients determined at a predetermined iterative step N, and at test step 2 the difference between the input signal and the reference signal is determined. If such difference meets the predetermined minimization criteria and therefore the decoded signal substantially corresponds to the pattern within the predetermined margin provided, then the set of coefficients corresponding to the iteration step is emitted as the output. If not, the iteration step N+1 is carried out for the further calculation of a set of coefficients of the decoding filter that further reduce the difference between the receive signal decoded by the coefficients calculated at the corresponding iteration step and the pattern of the reference signal.

Figure 6:
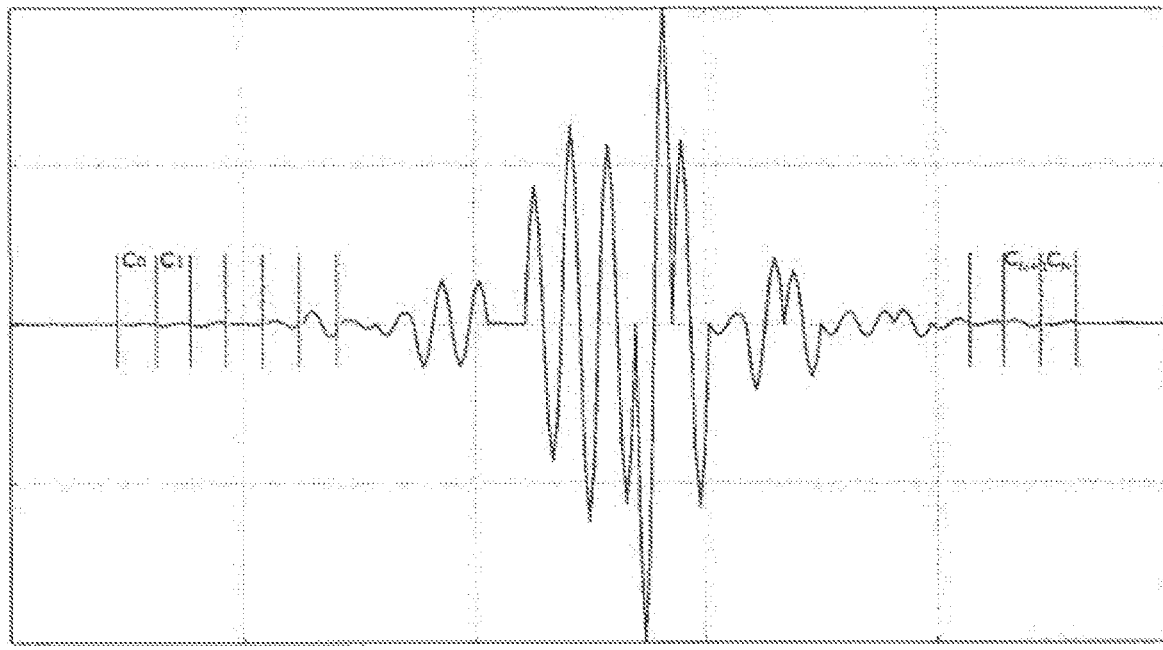
FIG. 6 is an example with 1 coefficient per transmission cycle.

The step of optimization and extraction of the coefficients of the decoding filter are described in more details with reference to an optimization system shown in FIG. 6.

A receive signal Rxi is acquired as the echo related to the coded transmission signal reflected by a suitable reflector at the i-th depth of the target environment; the receive signal originally composed of a sequence of samples acquired at fc (sampling frequency of the system) is suitably decimated by a factor D such to compose a sequence of samples spaced D/fc.

In the likeness of the sequence of n symbols used for the transmission coding, with duration of N*TB, where 1/TB is the carrier frequency, a similar sequence of coefficients is defined which are related to the starting convolution filter, they having a time duration TB too.

On the receive signal Rxi obtained in this manner a convolution product with the sequence related to the set of coefficients produced by the NLP solver 201 is operated in the convolutor 101, starting from the canonical start set (optimal filter). The canonical set can be composed of the coefficients calculated on the basis of the sequence inverse with respect to the coding sequence of the transmission signal.

The length of such set of coefficients is dimensioned in advance in the order of 2-3 times the length of the transmitted code.

The output of the convolutor 101 generates a response that is compared at 301 with a target pattern defined as pattern 401 of the nominal or reference receive signal that has been constructed in advance such to meet the qualitative and quantitative requirements of the application.

If the comparison is negative, the NLP solver block 201 is asked to repeat the attempt of producing a set of coefficients closer to the target, till the comparison produces a positive result.

In this latter case, the sequence of coefficients of the correlation filter is "photographed" by the selector block 501 and used for modulating 601 a series of samples describing the wave shape of the carrier at the sampling frequency of the system fc.

Thus the sequence of coefficients of the correlation filter operating at the system sampling frequency is obtained.

The NLP solver block 201 carries out an optimization function through a nonlinear process for example using one of the nonlinear optimization algorithms of the heuristic and metaheuristic type mentioned above.

The coefficients of the decoding filter obtained in this manner can be used for directly setting the ultrasound systems equipped with the corresponding type of probe for carrying out the imaging operation by a coded transmission.

Such values can be loaded automatically upon the connection of the probe. In this case the auto-installation function of the driver of the probe or auto-configuration function can take place by a memory of the probe containing at least one id of the type of probe that is read by the ultrasound system. Then the system, among the data already loaded therein, provides to search for the configuration file where the coefficients are stored and possibly other configuration information are stored and to load such coefficients in the filter.

As an alternative on the contrary it is the probe to have the coefficients and possibly also other configuration data loaded in a memory that is read by the system upon the connection of the probe or that provides an interface of a automatic installation software with the software of the ultrasound system allowing the configuration to be controlled by the probe at least for a part of such process.

As an alternative a file comprising the configuration data of the decoding filter can be stored on a removable storage medium that can be read by the ultrasound system that in turn provides to use information stored on the medium to directly configure the filters and/or for storing them in a internal database of a configuration driver of the probes and therefore providing to configure the filters.

Figure 5B:
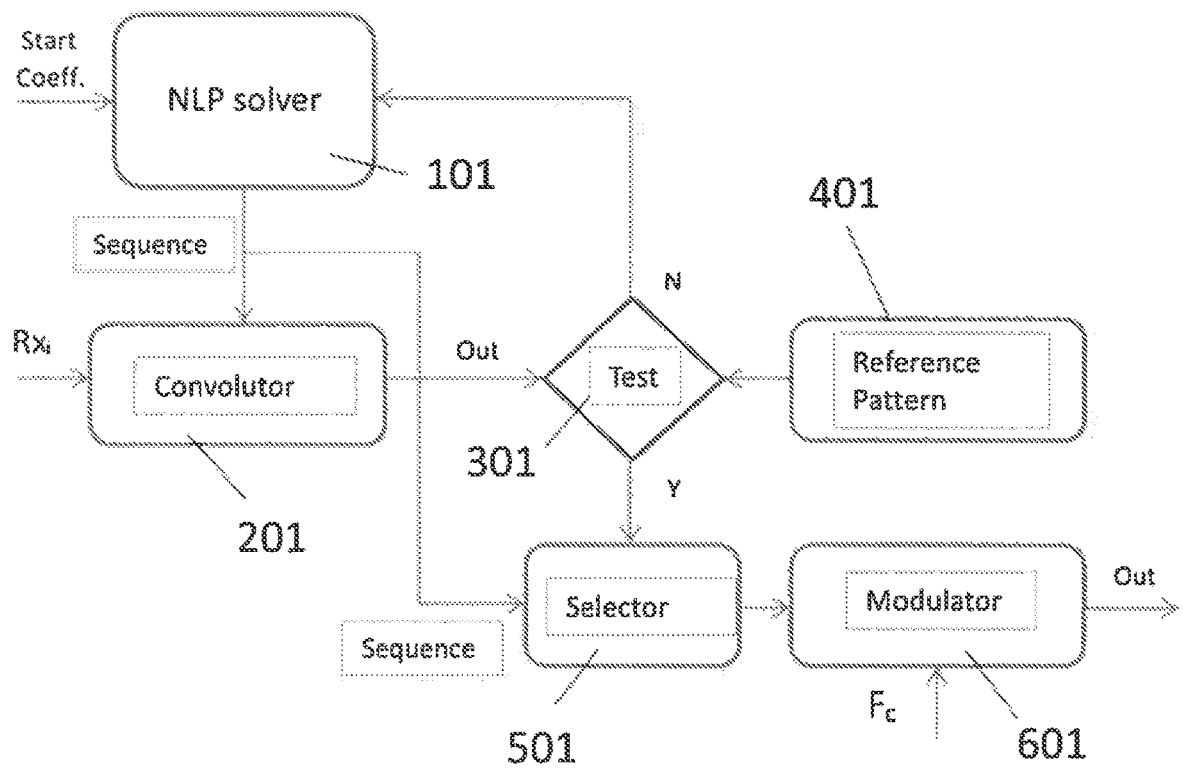
FIG. 5b is a diagram of an example of the system for carrying out the method according to the present invention.

In order to determine the coefficients of the filter as an alternative to the dedicated system of FIG. 5*b* it is possible to use an ultrasound apparatus provided with a data processor wherein a program is loaded that executes the functions of the operating units of the system 5*b*. At the end of the process determining the coefficients of the filter they can be stored directly in a memory of the ultrasound machine in a table or database containing the data about the type of probe, possibly also the manufacturer and other characteristic technical data of the probe and the coefficients calculated by using said probe that are uniquely associated thereto.

Figure 10:
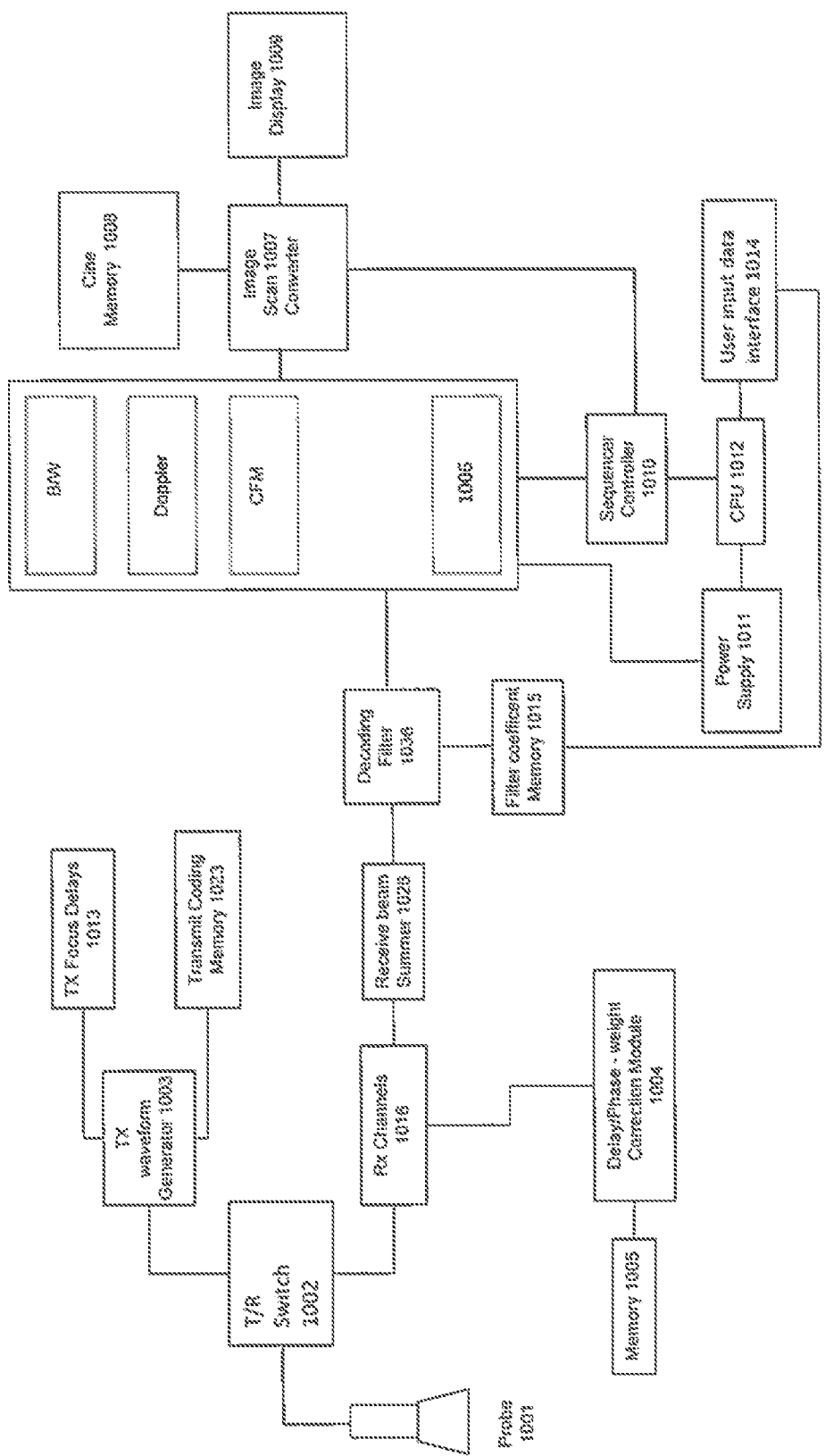
FIG. 10 illustrates a block diagram of an ultrasound system according to an embodiment.

FIG. 10 illustrates a high-level block diagram of an ultrasound system implemented in accordance with embodiments herein. Portions of the system (as defined by various functional blocks) may be implemented with dedicated hardware, analog and/or digital circuitry, and/or one or more processors operating program instructions stored in memory. Additionally, or alternatively, all or portions of the system may be implemented utilizing digital components, digital signal processors (DSPs) and/or field programmable gate arrays (FPGAs) and the like. The blocks/modules illustrated in FIG. 10 can be implemented with dedicated hardware (DPSs, FPGAs, memories) and/or in software with one or more processors.

The ultrasound system of FIG. 10 includes one or more ultrasound probes 1001. The probe 1001 may include various transducer array configurations, such as a one dimensional array, a two dimensional array, a linear array, a convex array and the like. The transducers of the array may be managed to operate as a 1D array, 1.25D array, 1.5D array, 1.75D array, 2D array, 3D array, 4D array, etc.

The ultrasound probe 1001 is coupled over a wired or wireless link to a beamformer. The beamformer includes a transmit (TX) beamformer and a receive (RX) beamformer which are connected to the probe 1001 by means of a switch 1002. The TX and RX portions of the beamformer may be implemented together or separately.

According to an embodiment, the transmit beamformer comprises a TX waveform generator 1003 which generates the transmit signals that are supplied to the single transducer elements of the transducer array of the probe 1001. The transmit signals may represent various types of ultrasound TX signals such as used in connection with B-mode imaging, Doppler imaging, color Doppler imaging, pulse-inversion transmit techniques, contrast-based imaging, M-mode imaging and the like. Additionally, or alternatively, the transmit signals may include single or multi-line transmit, shear wave transmit signals and the like.

The beamformer performs beamforming of the transmit beams in order to focalize the transmit beams progressively along different adjacent lines of sight covering the entire ROI. The beamformer performs also beamforming upon received echo signals to form beamformed echo signals in connection to pixel locations distributed across the region of interest. For example, in accordance with certain embodiments, the transducer elements generate raw analog receive signals that are supplied to the beamformer. The beamformer adjusts the delays to focus the receive signal along one or more select receive beams and at one or more select depths within the region of interest (ROI). The beamformer adjusts the weighting of the receive signals to obtain a desired apodization and profile. The beamformer applies weights and delays to the receive signals from individual corresponding transducers of the probe. The delayed, weighted receive signals are then summed to form a coherent receive signals. The focusing delays for the transmit beams are stored in a Tx Focus delays memory 1013 and are used by the TX wave form generator 1003 in order to drive the single transducer element so that the contribution of each of the said transducer elements combined together generates a transmit beam focused on the desired line and at the desired depth.

Further to the FX focus delays, the waveform generator 1003 is also coupled to a transmit coding memory 1023 in which at least a coding function is stored for applying a coding to the transmit pulses.

The beamformer includes also units for performing beamforming of the received beams. In an embodiment an A/D converter that digitizes the receive signals at a selected sampling rate is provided, although non illustrated. The digitization process may be performed before or after the summing operation that produces the coherent receive signals in a receive beam summer unit 1026.

Optionally, a dedicated sequencer/timing controller 1010 may be programmed to manage acquisition timing which can be generalized as a sequence of firings aimed at select reflection points/targets in the ROI. The sequence controller 1010 manages operation of the TX/RX beamformer in connection with transmitting ultrasound beams and measuring image pixels at individual LOS locations along the lines of sight. The sequence controller 1010 also manages collection of receive signals.

One or more processors 1006 perform various processing operations as described herein.

In accordance with embodiments herein the beamformer 0 includes an output that is configured to be coupled to an ultrasound probe 1001 and sends signals to the transducer elements of the probe 1001.

According to an embodiment herein the sequencer 1010 controls the beamformer in order to generate and transmit a plurality of transmit beams which are focalized in such a way as to show an aperture or a beam width encompassing a certain number of line of sights ore of receive lines. The transmit beams of the said plurality being progressively laterally shifted along the array of transducer elements of the probe and thus along the ROI for scanning the entire ROI. A certain line of sight or a certain receive line will be encompassed by a certain number of different transmit beam of the said plurality as long as the said line of sight position or the said receive line position falls within the aperture of the said transmit beams or within the width of the said transmit beams. Thus for a reflecting point on a certain receive line or line of sight having a certain line position within the ROI and relatively to the transducer array of the probe a certain number of receive signals contributions are received each one deriving from a different transmit beam whose center transmit line having different lateral shifts relatively to the said reflecting point and to the corresponding receive line.

The receive data relatively to the echoes from the said reflecting point is a combination of the contributions of the receive signals from the said reflecting point deriving from the said certain number of transmit beams.

In accordance with embodiments herein, the beamformer includes an input that is configured to be coupled to an ultrasound probe 1001 and receive signals from transducers of the ultrasound probe 1001. The memory 1005 stores time delays to align contributions of reflection signals received by the transducers of the array of the probe 1001 from the reflectors in the ROI prior to summing in the summer 1026. The memory 1005 also stores phase corrections to correct phase differences of the receive signals contributions for each transducer element and deriving from each of the said certain number of differently laterally shifted transmit beams relatively to the receive line or line of sight on which the said reflector point is located.

A delay/phase correction (DPC) module 1004 is coupled to the memory 1005 and provides various delays and corrections to the signals at each channel 1016 of the beamformer. For example, the DPC module 1004 directs the beamformer to apply time delay and phase correction to the receive signals to form delayed receive signals. The beamformer then sums, in a coherent manner, the delayed receive signals to obtain a coherent receive signal in connection with a reflection point or a reflection target.

Optionally, the memory 1005 may store a common phase shift correction in connection with multiple channels. Different phase shift corrections may be stored in connection with various corresponding channels in the case of multiple receive signals are received along a common receive line position but due to a certain number of different transmit beams each one having a laterally shifted transmit center line and an aperture or width encompassing the receive line position. The memory 105 may also store weights such as apodization weights and/or RTB weights.

As explained herein, the beamformer 1003 (circuitry) is configured to apply contemporaneously to each receive signal contribution of each transducer element from a reflection point a beamforming focalization delay and a phase shift equalization delay so called RTB delay. The said beamforming focalization delay being calculated basing on the time of arrival of the said signal contribution to a transducer element when traveling from the reflection point to the said transducer element and the said phase shift equalization delay being determined according to the difference in phase of the wave front reaching the reflecting point relatively to the phase of the wave fronts reaching the same reflecting point and being of further transmitted beams which are laterally shifted each other.

Optionally, the memory 1005 may store a pre-calculated table, where the pre-calculated table comprises real times of arrival of the receive signals relative to a predetermined reflection point. Optionally, the processor 1006 may be configured to calculate real times of arrival of the receive signals relative to a predetermined reflection point. Optionally the memory 1005 may store a pre-calculated table, where the pre-calculated table comprises pre-calculated phase shift equalization delays to be applied contemporaneously to the beamforming focalization delays to the receive signals of a receive line along a certain line of sight or a certain receive line position deriving from a certain number of transmit beams being differently laterally shifted relatively to the said receive line position, the number of the said transmit beams being set by setting a certain aperture or lateral width of the said transmit beams. Optionally the memory 1005 may store a pre-calculated table of the said phase shift equalization delays which are pre-calculated for one or more of different transmit beams apertures or widths.

Optionally, the processor 1006 may be configured to calculate the said phase shift equalization delays for one or more of different transmit beams apertures or widths.

Optionally, the beamformer circuitry may further comprise an adder unit for adding the beamforming delays and the phase shift equalization delays (RTB delays) for the receive signal contributions deriving from each reflecting point.

According to the present embodiment, the output of the summer 1026 I connected to a decoding filter 1036 according one of the embodiments described above as for example a FIR filter. The decoding filter 1036 is configured with filter coefficients which are determined according to the method and with the systems disclosed above and which are store in a memory 1015.

Storing the filter coefficients in the memory may be carried out by a wired or wireless connection with the memory and by transmitting to the memory the said filter coefficients. In the present embodiment of FIG. 10 the data relating to the filter coefficients are stored in the memory 1015 through a user interface 1014.

According to a further embodiment the filter coefficients may be stored on a readable support such as a drive pen, a portable memory an hard disk, a chip-card or a Cd, DVD ROM or RAM disk and the generic indicated user interface 1014 may comprise one or more reader units suitable to cooperate for reading the data on the different possible readable data supports.

In accordance with certain embodiments, at least a portion of the beamforming process may be implemented by the processor 1006 (e.g., in connection with software RTB beamforming). For example, the memory 105 may store beamforming related program instructions that are implemented by the processor 106 to contemporaneously apply beamforming delays and phase shift equalization delays to the receive signals.

The processor 1006 and/or CPU 1012 also performs conventional ultrasound operations. For example, the processor 106 executes a B/W module to generate B-mode images. The processor 1006 and/or CPU 1012 executes a Doppler module to generate Doppler images. The processor executes a Color flow module (CFM) to generate color flow images. The processor 1006 and/or CPU 1012 may implement additional ultrasound imaging and measurement operations. Optionally, the processor 1006 and/or CPU 1012 may filter the first and second displacements to eliminate movement-related artifacts.

An image scan converter 1007 performs scan conversion on the image pixels to convert the format of the image pixels from the coordinate system of the ultrasound acquisition signal path (e.g., the beamformer, etc.) and the coordinate system of the display. For example, the scan converter 1007 may convert the image pixels from polar coordinates to Cartesian coordinates for image frames.

A cine memory 1008 stores a collection of image frames over time. The image frames may be stored formatted in polar coordinates, Cartesian coordinates or another coordinate system.

An image display 1009 displays various ultrasound information, such as the image frames and information measured in accordance with embodiments herein. The display 1009 displays the ultrasound image with the region of interest shown.

A control CPU module 1012 is configured to perform various tasks such as implementing the user/interface and overall system configuration/control. In case of fully software implementation of the ultrasound signal path, the processing node usually hosts also the functions of the control CPU.

A power supply circuit 1011 is provided to supply power to the various circuitry, modules, processors, memory components, and the like. The power supply 1011 may be an A.C. power source and/or a battery power source (e.g., in connection with portable operation).

FIG. 7 illustrates a block diagram of an ultrasound system formed in accordance with an alternative embodiment. The system of FIG. 7 implements the operations described herein in connection with various embodiments. By way of example, one or more circuits/processors within the system implement the operations of any processes illustrated in connection with the figures and/or described herein. The system includes a probe interconnect board 702 that includes one or more probe connection ports 704. The connection ports 704 may support various numbers of signal channels (e.g., 128, 192, 256, etc.). The connector ports 704 may be configured to be used with different types of probe arrays (e.g., phased array, linear array, curved array, 1D, 1.25D, 1.5D, 1.75D, 2D array, etc.). The probes may be configured for different types of applications, such as abdominal, cardiac, maternity, gynecological, urological and cerebrovascular examination, breast examination and the like.

One or more of the connection ports 704 may support acquisition of 2D image data and/or one or more of the connection ports 704 may support 3D image data. By way of example only, the 3D image data may be acquired through physical movement (e.g., mechanically sweeping or physician movement) of the probe and/or by a probe that electrically or mechanically steers the transducer array.

The probe interconnect board (PIB) 702 includes a switching circuit 706 to select between the connection ports 704. The switching circuit 706 may be manually managed based on user inputs. For example, a user may designate a connection port 704 by selecting a button, switch or other input on the system. Optionally, the user may select a connection port 704 by entering a selection through a user interface on the system.

Optionally, the switching circuit 706 may automatically switch to one of the connection ports 704 in response to detecting a presence of a mating connection of a probe. For example, the switching circuit 706 may receive a "connect" signal indicating that a probe has been connected to a selected one of the connection ports 704. The connect signal may be generated by the probe when power is initially supplied to the probe when coupled to the connection port 704. Additionally, or alternatively, each connection port 704 may include a sensor 705 that detects when a mating connection on a cable of a probe has been interconnected with the corresponding connection port 704. The sensor 705 provides signal to the switching circuit 706, and in response thereto, the switching circuit 706 couples the corresponding connection port 704 to PIB outputs 708. Optionally, the sensor 705 may be constructed as a circuit with contacts provided at the connection ports 704. The circuit remains open when no mating connected is joined to the corresponding connection port 704. The circuit is closed when the mating connector of a probe is joined to the connection port 704.

A control line 724 conveys control signals between the probe interconnection board 702 and a digital processing board 724. A power supply line 736 provides power from a power supply 740 to the various components of the system, including but not limited to, the probe interconnection board (PIB) 702, digital front end boards (DFB) 710, digital processing board (DPB) 726, the master processing board (M PB) 744, and a user interface control board (UI CB) 746. A temporary control bus 738 interconnects, and provides temporary control signals between, the power supply 740 and the boards 702, 710, 726, 744 and 746. The power supply 740 includes a cable to be coupled to an external AC power supply. Optionally, the power supply 740 may include one or more power storage devices (e.g. batteries) that provide power when the AC power supply is interrupted or disconnected. The power supply 740 includes a controller 742 that manages operation of the power supply 740 including operation of the storage devices.

Additionally, or alternatively, the power supply 740 may include alternative power sources, such as solar panels and the like. One or more fans 743 are coupled to the power supply 740 and are managed by the controller 742 to be turned on and off based on operating parameters (e.g. temperature) of the various circuit boards and electronic components within the overall system (e.g. to prevent overheating of the various electronics).

The digital front-end boards 710 providing analog interface to and from probes connected to the probe interconnection board 702. The DFB 710 also provides pulse or control and drive signals, manages analog gains, includes analog to digital converters in connection with each receive channel, provides transmit beamforming management and receive beamforming management and vector composition (associated with focusing during receive operations).

The digital front end boards 710 include transmit driver circuits 712 that generate transmit signals that are passed over corresponding channels to the corresponding transducers in connection with ultrasound transmit firing operations. The transmit driver circuits 712 provide pulse or control for each drive signal and transmit beamforming management to steer firing operations to points of interest within the region of interest. By way of example, a separate transmit driver circuits 712 may be provided in connection with each individual channel, or a common transmit driver circuits 712 may be utilized to drive multiple channels. The transmit driver circuits 712 cooperate to focus transmit beams to one or more select points within the region of interest. The transmit driver circuits 712 may implement single line transmit, encoded firing sequences, multiline transmitter operations, generation of shear wave inducing ultrasound beams as well as other forms of ultrasound transmission techniques.

The digital front end boards 710 include receive beamformer circuits 714 that received echo/receive signals and perform various analog and digital processing thereon, as well as phase shifting, time delaying and other operations in connection with beamforming. The beam former circuits 714 may implement various types of beamforming, such as single-line acquisition, multiline acquisition as well as other ultrasound beamforming techniques.

The digital front end boards 716 include continuous wave Doppler processing circuits 716 configured to perform continuous wave Doppler processing upon received echo signals. Optionally, the continuous wave Doppler circuits 716 may also generate continuous wave Doppler transmit signals.

The digital front-end boards 710 are coupled to the digital processing board 726 through various buses and control lines, such as control lines 722, synchronization lines 720 and one or more data bus 718. The control lines 722 and synchronization lines 720 provide control information and data, as well as synchronization signals, to the transmit drive circuits 712, receive beamforming circuits 714 and continuous wave Doppler circuits 716.

The data bus 718 conveys RF ultrasound data from the digital front-end boards 710 to the digital processing board 726. Optionally, the digital front end boards 710 may convert the RF ultrasound data to I,Q data pairs which are then passed to the digital processing board 726.

The digital processing board 726 includes an RF and imaging module 728, a color flow processing module 730, an RF processing and Doppler module 732 and a PCI link module 734. The digital processing board 726 performs RF filtering and processing, processing of black and white image information, processing in connection with color flow, Doppler mode processing (e.g. in connection with polls wise and continuous wave Doppler). The digital processing board 726 also provides image filtering (e.g. speckle reduction) and scanner timing control. The digital processing board 726 may include other modules based upon the ultrasound image processing functionality afforded by the system.

The modules 728-734 comprise one or more processors, DSPs, and/or FPGAs, and memory storing program instructions to direct the processors, DSPs, and/or FPGAs to perform various ultrasound image processing operations. The RF and imaging module 728 performs various ultrasound related imaging, such as B mode related image processing of the RF data. The RF processing and Doppler module 732 convert incoming RF data to I,Q data pairs, and performs Doppler related processing on the I, Q data pairs. Optionally, the imaging module 728 may perform B mode related image processing upon I, Q data pairs. The CFM processing module 730 performs color flow related image processing upon the ultrasound RF data and/or the I, Q data pairs. The PCI link 734 manages transfer of ultrasound data, control data and other information, over a PCI express bus 748, between the digital processing board 726 and the master processing board 744.

The master processing board 744 includes memory 750 (e.g. serial ATA solid-state devices, serial ATA hard disk drives, etc.), a VGA board 752 that includes one or more graphic processing unit (GPUs), one or more transceivers 760 one or more CPUs 752 and memory 754. The master processing board (also referred to as a PC board) provides user interface management, scan conversion and cine loop management. The master processing board 744 may be connected to one or more external devices, such as a DVD player 756, and one or more displays 758. The master processing board includes communications interfaces, such as one or more USB ports 762 and one or more ports 764 configured to be coupled to peripheral devices. The master processing board 744 is configured to maintain communication with various types of network devices 766 and various network servers 768, such as over wireless links through the transceiver 760 and/or through a network connection (e.g. via USB connector 762 and/or peripheral connector 764).

The network devices 766 may represent portable or desktop devices, such as smart phones, personal digital assistants, tablet devices, laptop computers, desktop computers, smart watches, ECG monitors, patient monitors, and the like. The master processing board 744 conveys ultrasound images, ultrasound data, patient data and other information and content to the network devices for presentation to the user. The master processing board 744 receives, from the network devices 766, inputs, requests, data entry and the like.

The network server 768 may represent part of a medical network, such as a hospital, a healthcare network, a third-party healthcare service provider, a medical equipment maintenance service, a medical equipment manufacturer, a government healthcare service and the like. The communications link to the network server 768 may be over the Internet, a private intranet, a local area network, a wide-area network, and the like.

The master processing board 744 is connected, via a communications link 770 with a user interface control board 746. The communications link 770 conveys data and information between the user interface and the master processing board 744. The user interface control board 746 includes one or more processors 772, one or more audio/video components 774 (e.g. speakers, a display, etc.). The user interface control board 746 is coupled to one or more user interface input/output devices, such as an LCD touch panel 776, a trackball 778, a keyboard 780 and the like. The processor 772 manages operation of the LCD touch panel 776, as well as collecting user inputs via the touch panel 776, trackball 778 and keyboard 780, where such user inputs are conveyed to the master processing board 744 in connection with implementing embodiments herein.

Figure 8:
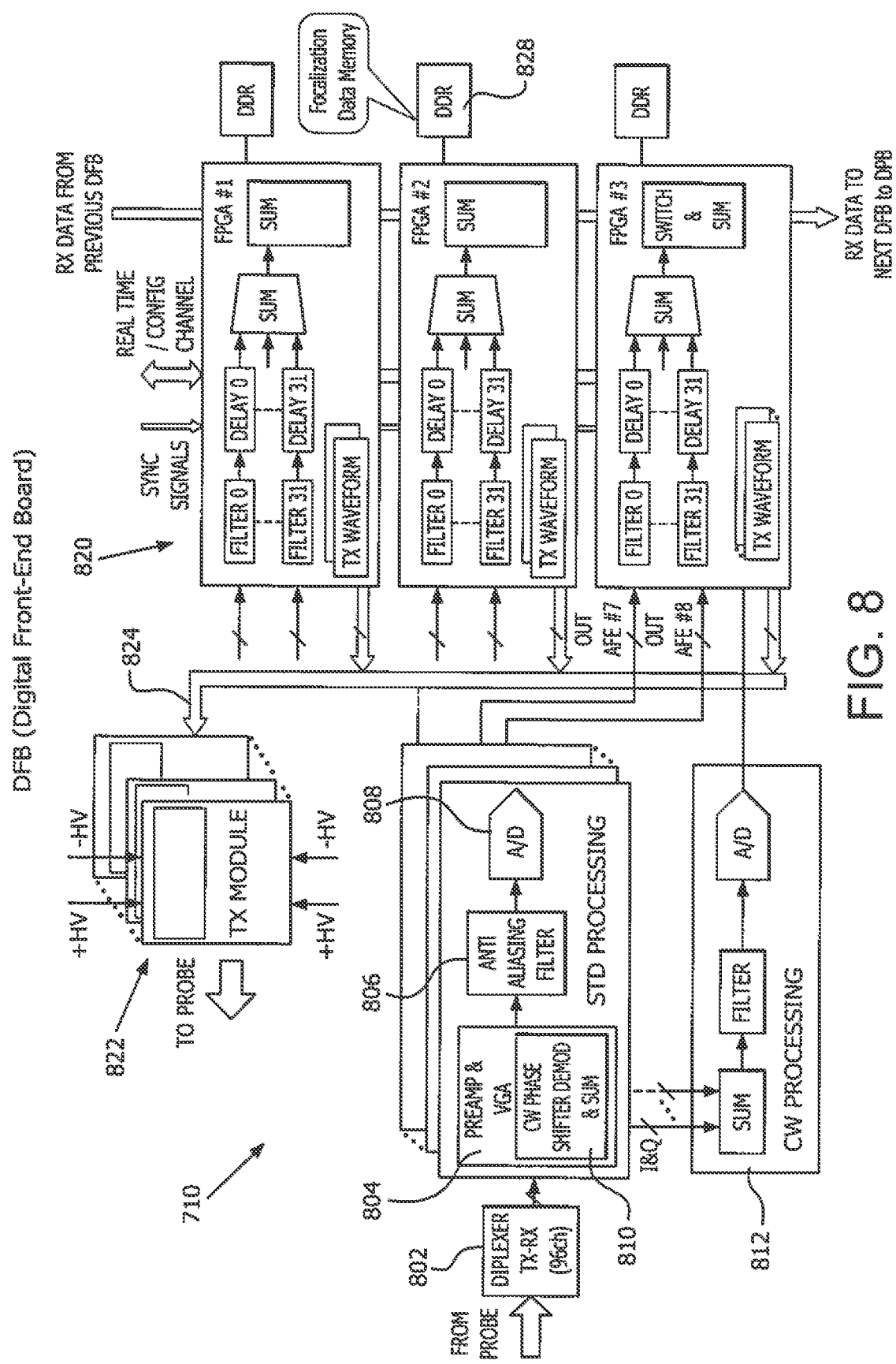
FIG. 8 illustrates a block diagram of a portion of the digital front-end boards.

FIG. 8 illustrates a block diagram of a portion of the digital front-end boards 710 formed in accordance with embodiments herein. A group of diplexers 802 receive the ultrasound signals for the individual channels over the PIB output 808. The ultrasound signals are passed along a standard processing circuit 805 or to a continuous wave processing circuit 812, based upon the type of probing utilized. When processed by the standard processing circuit 805, a preamplifier and variable gain amplifier 804 process the incoming ultrasound receive signals that are then provided to an anti-aliasing filter 806 which performs anti-aliasing filtering.

According to an embodiment the retrospective transmit beam focusing according to the present invention may be applied to the RF data directly acquired by the system or to transformed data according to different transformations as for example as a phase/quadrature (I/Q) transformation, or similar.

In the embodiment of FIG. 8 an example of the said transformation of the RF data is disclosed According to this example, the output of the filter 806 is provided to an A/D converter 808 that digitizes the incoming analog ultrasound receive signals. When a continuous wave (CW) probe is utilized, the signals therefrom are provided to a continuous wave phase shifter, demodulator and summer 810 which converts the analog RF receive signals to I,Q data pairs. The CW I,Q data pairs are summed, filtered and digitized by a continuous wave processing circuit 812. Outputs from the standard or continuous wave processing circuits 805, 812 are then passed to beam forming circuits 820 which utilize one or more FPGAs to perform filtering, delaying and summing the incoming digitized receive signals before passing the RF data to the digital processing board 826 (FIG. 7). The FPGAs receive focalization data from memories 828. The focalization data is utilized to manage the filters, delays and summing operations performed by the FPGAs in connection with beamforming. The beamformed RF or I/Q data is passed between the beamforming circuits 820 and ultimately to the digital processing board 726.

The digital front-end boards 710 also include transmit modules 822 that provide transmit drive signals to corresponding transducers of the ultrasound probe. The beamforming circuits 820 include memory that stores transmit waveforms. The transmit modules 822 receive transmit waveforms over line 824 from the beamforming circuits 820.

Figure 9:
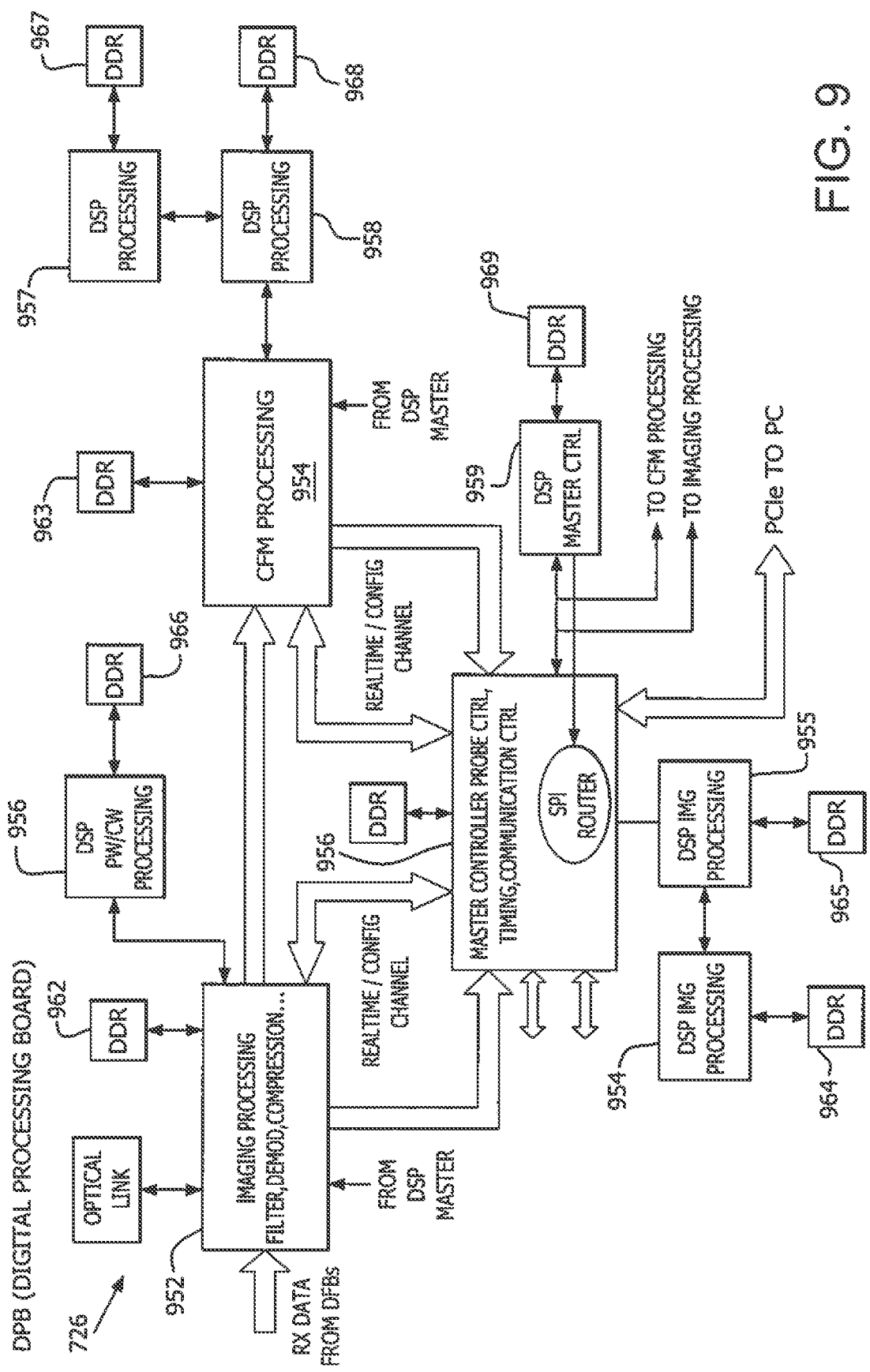
FIG. 9 illustrates a block diagram of the digital processing board.

FIG. 9 illustrates a block diagram of the digital processing board 726 implemented in accordance with embodiments herein. The digital processing board 726 includes various processors 952-959 to perform different operations under the control of program instructions saved within corresponding memories see 962-969. A master controller 950 manages operation of the digital processing board 726 and the processors 952-959. By way of example, one or more processors as the 952 may perform filtering, the modulation, compression and other operations, while another processor 953 performs color flow processing. The master controller provides probe control signals, timing control signals, communications control and the like. The master controller 950 provides real-time configuration information and synchronization signals in connection with each channel to the digital front-end board 710.

It should be clearly understood that the various arrangements and processes broadly described and illustrated with respect to the FIGS., and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

Aspects are described herein with reference to the FIGS., which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

One or more of the operations described above in connection with the methods may be performed using one or more processors. The different devices in the systems described herein may represent one or more processors, and two or more of these devices may include at least one of the same processors. In one embodiment, the operations described herein may represent actions performed when one or more processors (e.g., of the devices described herein) execute program instructions stored in memory (for example, software stored on a tangible and non-transitory computer readable storage medium, such as a computer hard drive, ROM, RAM, or the like).

The processor(s) may execute a set of instructions that are stored in one or more storage elements, in order to process data. The storage elements may also store data or other information as desired or needed. The storage element may be in the form of an information source or a physical memory element within the controllers and the controller device. The set of instructions may include various commands that instruct the controllers and the controller device to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

The controller may include any processor-based or microprocessor-based system including systems using microcontrollers, reduced instruction set computers (RISC), application specific integrated circuitry (ASICs), field-programmable gate arrays (FPGAs), logic circuitry, and any other circuit or processor capable of executing the functions described herein. When processor-based, the controller executes program instructions stored in memory to perform the corresponding operations. Additionally or alternatively, the controllers and the controller device may represent circuitry that may be implemented as hardware. The above examples are exemplary only, and are thus not intended to limit in any way the definition and/or meaning of the term "controller."

Optionally, aspects of the processes described herein may be performed over one or more networks one a network server. The network may support communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The embodiments described herein may include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Various embodiments may further include receiving, sending, or storing instructions and/or data implemented in accordance with the foregoing description upon a computer-readable medium. Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

The invention claimed is:

1. A method for optimization of a process decoding coded ultrasound signals, which method provides the following steps:
defining and selecting a coding function for ultrasound pulses transmitted to a body under examination by transducers of a predetermined probe and transmitting the ultrasound signals coded according to the coding function via the transducers of said predetermined probe;
defining coefficients of a filter decoding a received signal from the transducers depending on the coding function;

using said coefficients as a setting of a decoding filter corresponding to said predetermined probe for respective ultrasound systems provided in combination with said probe;

and wherein the coefficients of corresponding decoding filters are determined by minimization, by a heuristic iterative process, of a difference between characteristics of a receive signal, obtained in a real transmit and receive sequence on a phantom and filtered with the decoding filter having as coefficients those obtained in a prior iterative step, and the characteristics of an ideal receive signal, that is a nominal one, with the coefficients of a first iterative step being an initial input of the process.

2. The method according to claim 1, wherein it provides to use the coefficients of the decoding filter obtained by the last performed iteration as the coefficients of the decoding filters to be employed on ultrasound systems in combination with the predetermined type of probe.

3. The method according to claim 1, wherein there is provided the use of a coding, of the Barker type, and the optimization of the coefficients of the correlation filter is used to obtain the compression of the received signal in connection with a coded transmission with a length of N pulses or cycles.

4. The method according to claim 1, wherein the optimization algorithm is composed of an algorithm of the family of the so called Non Linear Programming (NLP) solvers.

5. The method according to claim 1, wherein by a sampling frequency Fc that involves an oversampling of the receive signals, the coefficients of the filter are defined by carrying out a decimation both of the filter coefficients themselves and of the receive signals to be compressed and wherein said decimation observes the constraints of the Nyquist sampling theorem.

6. A portable storage unit on which the coefficients setting the filter decoding the receive signals deriving from the reflection of transmission pulses coded by a predetermined function coding the transmission signal and for a predetermined type of probe of an ultrasound system with optimized coding/decoding process according to claim 1 are stored.

7. The portable storage unit according to claim 6, wherein a file containing the coefficients of the decoding filters for a predetermined type of probe are implemented in a form of a device driver installable on demand by a user or self-installable upon connection of a corresponding type of probe to an ultrasound system.

8. An ultrasound system for carrying out imaging by coded transmission pulses that provides at least one demodulator of the receive signal which demodulator is in the form of a decoding filter and whose coefficients are loadable or loaded from a configuration file generated by the method according to claim 1 and possibly in the form of configuration or driver file of the probe of the self-installing type or installable by a command.

9. A method for optimization of a process decoding coded ultrasound signals, which method provides the following steps:
defining and selecting a coding function for ultrasound pulses transmitted to a body under examination by transducers of a predetermined probe;
defining coefficients of a filter decoding a received signal from the transducers depending on the coding function;
using said coefficients as a setting of a decoding filter corresponding to said predetermined probe for respective ultrasound systems provided in combination with said probe;
wherein the coefficients of corresponding decoding filters are determined by minimization, by a heuristic iterative process, of a difference between characteristics of a receive signal, obtained in a real transmit and receive sequence and filtered with the decoding filter, and characteristics of an ideal receive signal, that is a nominal one, by using as the coefficients of the decoding filter those obtained in a last iterative step;
wherein defining the filter coefficients comprises:
a) defining or selecting the ideal, that is nominal, characteristics of the signal obtained by decoding the received echo signal, that is a reference nominal template or pattern of the decoded signals;
b) executing a sequence for the transmission of ultrasound signals coded according to the coding function and in a test environment where there are provided predetermined reflectors with a predetermined space distribution in said test target environment, for the reception of echo signals due to the reflection of said transmission coded pulses by said reflectors and for decoding the received echo signals, which decoding is carried out according to an initial selection of the coefficients of the decoding filter;
c) using the receive signals, decoded for determining the differences between the characteristics of said signals received and decoded at the previous step and the characteristics of the ideal, that is nominal, decoded receive signal, that is the reference nominal template or pattern of the decoded signal;
d) calculating by a heuristic optimization algorithm new coefficients of the decoding filter that minimize the difference between the characteristics of said received and decoded signals and those of the nominal decoded receive signal, that is of the reference nominal template or pattern of the decoded signal;
e) repeating steps c) and d) until reaching values below a maximum limit threshold for said differences between the signals received and decoded at the previous step and the nominal decoded receive signal, that is the reference nominal template or pattern of the decoded signal and/or until reaching a maximum number of iterations.

10. The method according to claim 9, wherein the optimization algorithm is based on one or more of the following parameters: signal-to-noise ratio, intensity of sidelobes or temporal spurious lobes, intensity of a response peak.

11. A method for optimization of a process decoding coded ultrasound signals, which method provides the following steps:
defining or selecting a coding function for ultrasound pulses transmitted to a body under examination by transducers of a predetermined probe and transmitting the ultrasound signals coded according to the coding function via the transducers of said predetermined probe;
defining coefficients of a filter decoding a received signal from the transducers depending on the coding function;
using said coefficients as a setting of a decoding filter corresponding to said predetermined probe for respective ultrasound systems provided in combination with said probe;
wherein the coefficients of corresponding decoding filters are determined by minimization, by a heuristic iterative process, of a difference between characteristics of a receive signal, obtained in a real transmit and receive sequence and filtered with the decoding filter, and the characteristics of an ideal receive signal, that is a nominal one, by using as the coefficients of the decoding filter those obtained in a last iterative step;
wherein defining the decoding coefficients comprises:
i) decimation by a predetermined decimation factor D of a receive signal composed originally of a sequence of samples acquired at a sampling frequency fc of a system such to compose a sequence of samples spaced D/fc;
ii) defining a starting sequence of coefficients of a deconvolution filter at a predetermined temporal duration TB and in the likeness of the sequence with a predetermined temporal duration used for the transmission coding;
iii) an execution on the receive signal of a convolution product with the sequence related to the set of coefficients produced by an optimization algorithm of the NLP Solver type, starting from an initial canonical set and having a length of said set of coefficients dimensioned a priori in the order of two or three times the length of the transmitted code;
iv) a comparison of said convolution product with a target pattern, that is a template or pattern of a nominal receive signal constructed in such a manner to meet the qualitative and quantitative requirements of the application;
v) a reiteration of the step calculating a set of coefficients of the decoding filter by the NLP Solver optimization algorithm, until the comparison of step iv) produces a positive result;
vi) storing the sequence of the coefficients of the correlation filter and
vii) determining the sequence of coefficients of the correlation filter operating at the sampling frequency fc of the system by using the sequence of the coefficients of the correlation filter stored at step vi) to modulate a series of samples describing the carrier waveform at the system sampling frequency fc.

12. The method according to claim 11, wherein decimation provides to determine the number of samples as a function of a decimation factor thereof and to define sampling points that describe the signal with reference to the starting point of the sampling as a function of the optimization of the approximation function.

13. The method according to claim 11, wherein the deconvolution filter is function of the samples $C_N$ at the sampling frequency Fc, of the sinusoidal kernel sequence at the carrier frequency Fp and with amplitude equal to the coefficients generated by the optimization process according to the following equation:

$$F_{appr.Full} = \Sigma_{i=0}^{i=N} C_i \times \text{Kernel}(F_p)_{Fc.}$$

14. A system comprising:
an ultrasound system comprising:
a beamformer generating signals exciting an ultrasound probe for emitting a sequence of coded pulses;
a transmitting probe of a predetermined type and having specific characteristics and to which said excitation signals are fed for generating and emitting ultrasound pulses coded according to a predetermined coding function;
a target test environment having a predetermined space distribution of at least two reflectors and wherein said transmission coded pulses of the probe are transmitted;
a hydrophone receiving said reflection signals generated by the transmission pulses emitted in the target test environment;
a memory for storing the receive signals produced by the hydrophone;
a processor that determines a set of coefficients for a filter decoding the coded signals by comparing characteristics of the receive signals measured by the hydrophone with a template or pattern, that is with characteristics of a reference nominal stored signal, which coefficients are determined as a result of the minimization of the difference between the characteristics of the received measurement signal and of the reference receive signal;
a unit storing said coefficients in the form of a data file setting the ultrasound systems that use a probe of the type used as the transmission probe.

15. The system according to claim 14, wherein said memory comprises a portable digital reading and writing media, also of the rewritable type.

16. A method for optimization of a process decoding coded ultrasound signals, which method comprises:
defining or selecting a coding function for ultrasound pulses transmitted to a body under examination by transducers in a predetermined probe;
defining coefficients of a filter decoding a received signal from the transducers depending on the selected coding function;
using said coefficients as a setting of a decoding filter corresponding to said predetermined probe for respective ultrasound systems provided in combination with said probe;
and wherein coefficients of corresponding decoding filters are determined by minimization, by a heuristic iterative process, of a difference between characteristics of a receive signal, obtained in a real transmit and receive sequence and filtered with the decoding filter, and characteristics of an ideal receive signal, that is a nominal one, by using as the coefficients of the decoding filter those obtained in the last iterative step and wherein the step defining the filter coefficients comprises:
a) defining or selecting the ideal, that is nominal, characteristics of the signal obtained by decoding the received echo signal, that is a reference nominal template or pattern (model) of the decoded signals;
b) executing a sequence for the transmission of ultrasound signals coded according to the selected coding function and in a test environment where there are provided predetermined reflectors with a predetermined space distribution in said test target environment, for the reception of echo signals due to the reflection of said transmission coded pulses by said reflectors and for decoding the received echo signals, which decoding is carried out according to an initial selection of the coefficients of the decoding filter;
c) using the receive signals, decoded for determining the differences between the characteristics of said signals received and decoded at the previous step and the characteristics of the ideal, that is nominal, decoded receive signal, that is the reference nominal template or pattern of the decoded signal;
d) calculating by an heuristic optimization algorithm new coefficients of the decoding filter that minimize the difference between the characteristics of said received and decoded signals and those of the nominal decoded receive signal, that is of the reference nominal template or pattern of the decoded signal;
e) repeating steps c) and d) until reaching values below a maximum limit threshold for said differences between the signals received and decoded at the previous step and the nominal decoded receive signal, that is the reference nominal template or pattern of the decoded signal and/or until reaching a maximum number of iterations.

\* \* \* \* \*